June 12, 1928.  J. I. HAASE  1,673,505

HEEL MOLD

Filed Jan. 21, 1926

Inventor
Jorgen I. Haase,

By O.E. Bee
Attorney

Patented June 12, 1928.

1,673,505

UNITED STATES PATENT OFFICE.

JORGEN I. HAASE, OF AKRON, OHIO, ASSIGNOR TO THE GOODYEAR TIRE & RUBBER COMPANY, OF AKRON, OHIO, A CORPORATION OF OHIO.

HEEL MOLD.

Application filed January 21, 1926. Serial No. 82,709.

My invention relates to a mold for rubber articles and it has particular reference to a mold that is provided with a cutting element to sever excess rubber from a vulcanized heel before it is removed from the mold.

Rubber heels are manufactured by enclosing an unvulcanized blank of resilient material in a mold having a cavity of proper size and shape formed therein, and subjecting it to heat and pressure. During vulcanization, excess rubber, or overflow, creeps out around the edges of the mold cavity and is removed by a subsequent operation performed with a cutting instrument, in order to render the finished heel more acceptable. It has been proposed to provide the mold with a cutting edge, or die, to sever the overflow during vulcanization, and thereby avoid a subsequent expensive trimming operation, but to the best of my knowledge this proposal has not been utilized, due to the rapid deterioration of the suggested forms of dies when they are placed in service.

It is the object of the invention to provide a mold, having a durable cutting edge, wherein the overflow may be severed before the heel is removed.

The accompanying drawing shows a mold exemplifying the principles of the invention, wherein.

In a broad aspect, the mold comprises a pair of closure plates, that are adapted to be placed in contact with either surface of the heel, and a third member interposed therebetween and provided with an aperture to receive the blank. The apertured member is provided with a cutting edge that is adapted to be forced through the overflow from the heel before it is removed from the mold.

Figure 1:
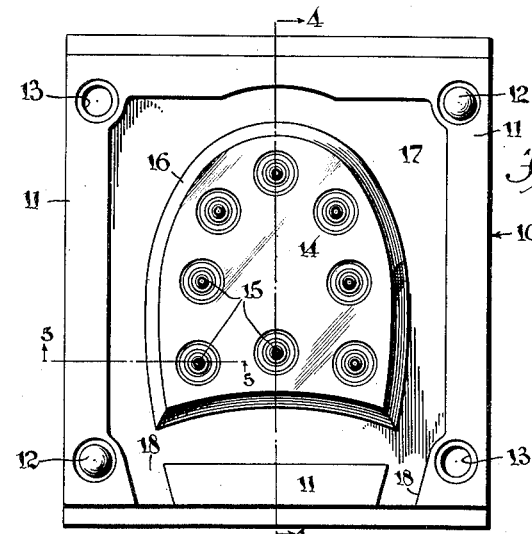
Figs. 1, 2 and 3 are plan views of three separable members forming the mold.

The lower closure plate, indicated generally by the reference numeral 10, and shown in Fig. 1, comprises a rectangular member having a plane raised portion 11 around its edge, that forms a bearing seat for the central member in a manner which will be explained presently. Dowel pins 12 and apertures 13 are provided at alternate corners of the plate, and coact with complemental elements formed on the other portions of the mold to provide proper alignment of the parts. The central portion of the plate is provided with a raised surface 14, having a shape the same as that of the finished heel, upon which is disposed a series of mold pins 15 for the reception of the customary washers that are imbedded in the heel during the process of vulcanization. The outer edge of the surface 14 is defined by a tapered shoulder 16, that merges into a recess 17 formed between the surface 14 and the raised portion 11. Passages 18 are provided along one edge of the plate 10, through the raised portion 11, and provide a means for the escape of steam condensed within the mold during the vulcanizing process.

Figure 3:
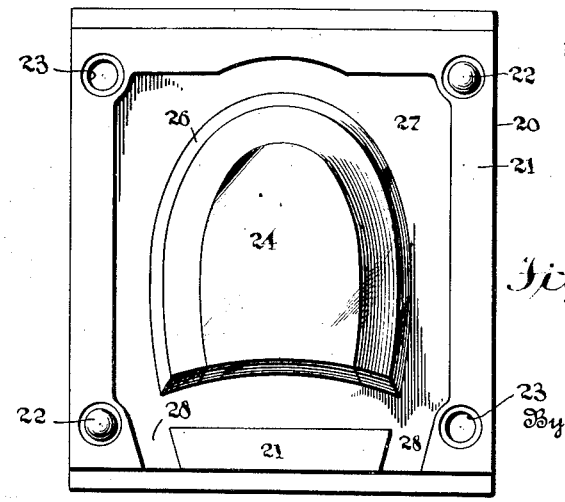

The upper closure plate, indicated generally by the reference numeral 20 and shown in Fig. 3, is provided with a plane raised portion 21 adjacent the edge, dowel pins 22 and apertures 23, similar in construction to those on the plate 10. The raised surface 24 of the plate is likewise dimensioned to impart the desired contour to the upper or lift portion of the heel, and it is defined by a tapered edge 26 that merges into the face 27 of the plate. Passages 28, similar to the passages 18, are provided along one edge of the plate through the raised edge 21.

The central member 30, that is adapted to be interposed between the plates 10 and 20, is provided with a raised portion 31 around its edge, adapted to seat against the portions 11 and 21 of the closure plates, and with apertures 32 at its corners for the reception of the dowel pins 12 and 22. The central portion of the plate is provided with an aperture 33 adapted to enclose the sidewalls of the heel, that is defined by a raised and beveled cutting edge 34, forming the die by means of which the overflow may be severed. The slope of the edge 34 varies at the breast portions 35 in order to provide sufficient strength along the cutting edge at the places where the curvature changes abruptly. The face 37 of the central member 30 is depressed below the edge 31, in order to provide a recess for the reception of overflow and for other purposes which will be explained presently.

Figure 4:
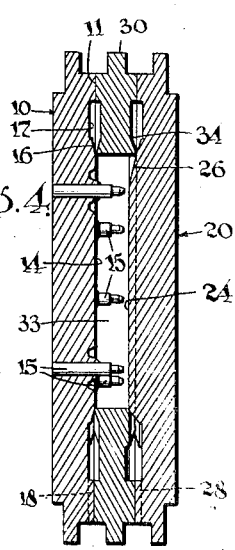
Fig. 4 is a cross-sectional view of the assembled mold taken along the line IV—IV of Fig. 1.
Figure 2:
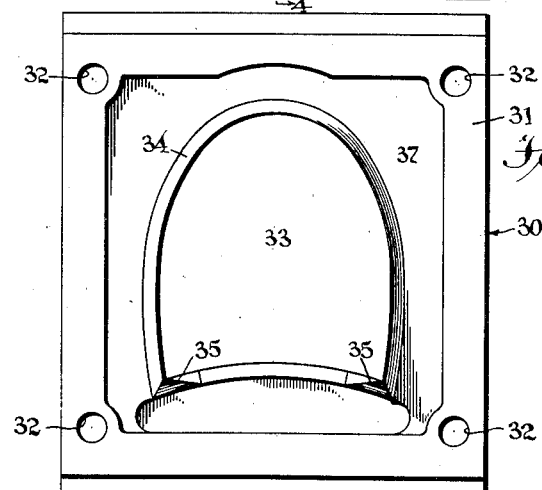
Figure 5:
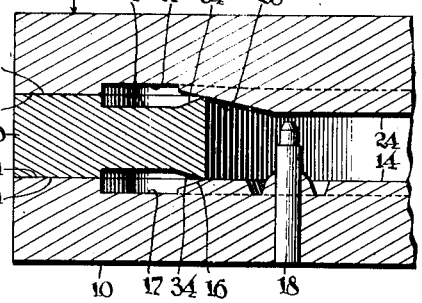
Fig. 5 is an enlarged fragmentary cross-sectional view taken along the line V—V of Fig. 1.

The parts are assembled, as shown in Figs. 4 and 5, with the plates 20 and 30 superimposed upon each other and upon the plate 10. It will be noted, by reference to these figures, that the beveled cutting edges 34 of the central plate 30 are disposed adjacent the tapered shoulders 16 and 26 of the plates 10 and 20. This construction is deemed more desirable, than one wherein the cutting edges of the central plate bear directly against a plane horizontal face, such as the surfaces 24 or 27. It has been observed that molds made according to the last named practice fail through the crushing of the cutting edge, due to the excessive load sustained thereby. However, if contact be made upon a beveled edge, the full force imposed upon the outer surface of the plate 20 is not sustained by the edge 34, but only a certain proportion or component thereof. The beveled edges are also voluble, since they direct the flow of excess rubber, and prevent the displacement of the mold parts that would occur if the surfaces were parallel.

It is also desirable to dimension the raised portions at the edges of the three members, with respect to the tapered surfaces 16, 26 and 34, so that under normal heating conditions practically all of the pressure imposed upon the plate 20 is received upon the raised portions 31 and 11, and practically no load is sustained by the cutting edge 34. The difference in the height of the portions 31 and 34 above the surface 37, for example, need not be very great to accomplish this result. When so dimensioned the raised outer portions of the three constituent members form the load supporting, or true bearing surfaces, and the tapered shoulders 16 and 26 barely contact with the beveled cutting edge 34. After the plastic heel blank has been expanded to fill the mold, a slight excess of pressure applied thereto will be sufficient to deform the plates so that the cutting edges 34 will sever the overflow collected in the cavities 26 and 17, and thus perform their necessary function without being subjected to the deteriorating effects induced from an excessive pressure imposed through the plates during the entire molding operation.

Another valuable advantage resides in making the central plate 30, and particularly the cutting edge 34 thereof, of harder metal than the closure plates 10 and 20. It has been found that the best service cannot be obtained if the hardness of the three parts is substantially the same. However, if only the cutting edge be hardened, and the beveled edges 16 and 26 be maintained at a lesser degree of hardness, the possibility of turning the cutting edge is greatly reduced. It has been found that desirable results may be attained by making one of the closure plates entirely of relatively soft metal, such as unhardened non-shrinkable steel, or an aluminum-manganese alloy. These metals have been found satisfactory, not only because of their relative softness when compared with the hard steel of the central plate, but also because they impart a desirable finish to the surface of the heel.

Preferably, the plate 10 is disposed during operation, as shown in Fig. 5, with the washer receiving pins 15 projecting upwardly, and with the plate 30 disposed thereon and aligned by the dowel pins 12. A heel slug is placed in the cavity 33, and the upper plate 20 is properly positioned to enclose the mold, that is then inserted in a suitable vulcanizing apparatus, where it is subjected to a normal pressure while the blank assumes the proper shape. This pressure is absorbed through the outer edges 11, 21 and 31 of the respective members, and practically none of it is transmitted through the cutting edges 34. During the process of vulcanization, excess rubber from the blank flows over the raised portions 34 and into the cavities formed between the faces 27 and 37, and 37 and 17. Prior to the removal of the mold from the vulcanizing apparatus, a slight excess of pressure is applied, which so deforms the plates that the cutting edges 34 press firmly against the tapered shoulders 16 and 26, and sever the overflow from the finished heel. The mold is then removed from the apparatus, disassembled, and the heel removed therefrom.

It will be noted that there are several distinctive features in this type of mold, each of which is believed to be of particular value. The cutting edge 34 does not bear firmly against the closure plates during the entire operation, nor does it receive a direct thrust, and hence destructive forces which would tend to shorten the life of the mold are avoided. The cutting edge, after penetrating the overflow, bears against a plate of softer material, and hence it is not subjected to destructive forces that would be present, if the edges 26 and 16 were as hard as the die. All of these features need not be combined to attain successful operation, but they are deemed advantageous, for each of them is of proven value in increasing the life of the mold.

It is possible, of course, to form the mold in two parts rather than three, but inasmuch as the molded heel fits snugly within the cavity 33, a three part mold is preferable as removal of the heel therefrom is greatly facilitated. Heel molds are usually employed in sets, instead of singly, and it is to be understood that a multiple type mold may be made to incorporate the advantageous features described herein without departing from the spirit of the invention. Various other changes may also be effected, and hence it is intended that the invention should be limited only as indicated by the scope of the following claims.

What I claim is:

1. A mold for a rubber article comprising a plurality of members adapted to be disposed around the article, bearing seats adapted to absorb the load imposed upon the members when subjected to normal pressures, and means for removing excess material from the article adapted to press firmly against the adjacent part of the mold only when it is subjected to excessive pressure.

2. A mold for a rubber article comprising a pair of plates adapted to bear against opposite sides of the article, an apertured member provided with a cutting edge along the cavity adapted to press against the plates, under excessive pressure, and a raised portion adapted to sustain substantially all of the load imposed upon the member under normal pressure.

3. A mold for a rubber article comprising a plurality of members adapted to be disposed around the article, bearing seats adapted to absorb the load imposed upon the members when subjected to normal pressures, and means for removing excess material from the article comprising a beveled die adapted to press firmly against a tapered ledge formed on an adjacent part of the mold only when it is subjected to excessive pressure.

4. A mold for a rubber article comprising a plate having a raised portion formed thereon and defined by a tapered edge, a member provided with a raised and tapered cutting edge adjacent an aperture formed therein adapted to contact with the tapered edge of the plate when the parts are assembled in superimposed relation, raised portions formed upon both the plate and apertured member providing bearing and load sustaining seats under normal pressure, and a plate adapted to be superimposed upon the assembled members and to provide a closure for the mold.

5. A mold for rubber articles comprising plates adapted to be disposed above and below the article and a member formed with an aperture provided with a cutting edge adjacent thereto of harder material than the plates, the cutting edge being disposed in a plane parallel to but spaced from the plane of the normal plate-engaging surface of the member.

6. A rubber heel mold comprising a pair of plates formed with raised portions thereon defining the upper and lower surfaces of a heel, and merging into the plates through tapered shoulders, raised plane surfaces formed at the edges of the plates adapted to bear under normal pressure against similarly formed surfaces of a member adapted to be inserted between the plates, and formed with an aperture having raised beveled cutting edges adapted to contact lightly with the tapered shoulders of the plates when superimposed and subjected to normal pressure, and to cut through overflow from the molded heel when the superimposed plates are subjected to excessive pressure, the cutting edges in the apertured member being harder than the tapered shoulders with which they contact.

In witness whereof, I have hereunto signed my name.

JORGEN I. HAASE.